United States Patent
Takaya et al.

(10) Patent No.: US 9,019,051 B2
(45) Date of Patent: Apr. 28, 2015

(54) ATTACHMENT/DETACHMENT STRUCTURE FOR ELECTROMAGNETIC CONTACTOR AND ACCESSORY UNIT AND ASSEMBLY METHOD FOR MOVABLE HOOK PORTION PROVIDED IN ACCESSORY UNIT

(75) Inventors: Kouetsu Takaya, Kounosu (JP); Koji Okubo, Kounosu (JP); Yasuhiro Naka, Kounosu (JP); Kenji Suzuki, Kounosu (JP)

(73) Assignee: Fuji Electric FA Componenets & Systems Co., Ltd., Tokyo (JP)

( * ) Notice: Subject to any disclaimer, the term of this patent is extended or adjusted under 35 U.S.C. 154(b) by 401 days.

(21) Appl. No.: 13/499,562

(22) PCT Filed: Sep. 13, 2010

(86) PCT No.: PCT/JP2010/005584
§ 371 (c)(1),
(2), (4) Date: May 24, 2012

(87) PCT Pub. No.: WO2011/092761
PCT Pub. Date: Aug. 4, 2011

(65) Prior Publication Data
US 2012/0240366 A1    Sep. 27, 2012

(30) Foreign Application Priority Data

Jan. 27, 2010 (JP) ................................. 2010-015214

(51) Int. Cl.
*H01H 9/02* (2006.01)
*H01H 13/04* (2006.01)
(Continued)

(52) U.S. Cl.
CPC ......... *H01H 50/045* (2013.01); *Y10T 29/49826* (2015.01); *Y10T 24/4544* (2015.01); *H01H 9/20* (2013.01); *H01H 50/541* (2013.01); *H01H 50/546* (2013.01)

(58) Field of Classification Search
USPC ........ 335/202; 24/572.1, 591.1, 598.1, 598.4, 24/601.6; 29/428, 592
See application file for complete search history.

(56) References Cited

U.S. PATENT DOCUMENTS 5,605,224 A * 2/1997 Seymour et al. .............. 200/401
5,652,420 A * 7/1997 Innes et al. ................. 200/50.32
(Continued)

FOREIGN PATENT DOCUMENTS

JP   S54-179457 A   12/1979
JP   S59-69466      5/1984
(Continued)

*Primary Examiner* — Bernard Rojas
(74) *Attorney, Agent, or Firm* — Manabu Kanesaka (57) ABSTRACT

A movable hook portion (13) provided in a unit side coupling surface (2a) of an accessory unit (2) includes a hook portion main body (14), which is formed with a movable claw (23a) and a pressed piece (22), and a straight spring (15), slidably accommodates the hook portion main body (14) in a main body accommodation concave portion (16) formed in the unit side coupling surface (2a), and accommodates the straight spring (15) in a spring accommodation concave portion (17a) formed in the unit side coupling surface (2a) so as to be orthogonal to a sliding direction of the hook portion main body (14), with a middle portion in a length direction of the spring being engaged with the hook portion main body (14). When the hook portion main body (14) is slid in a disengaging direction which brings the movable claw (23a) and a hooking hole (8a) of an electromagnetic contactor (1) into a disengaged state by pressing the pressed piece (24), an elastic restoring force of the straight spring (15) elastically deformed into a bow-like shape acts on the hook portion main body (14) in a direction opposite to the disengaging direction.

6 Claims, 4 Drawing Sheets

(51) Int. Cl.
*H01H 50/04* (2006.01)
*H01H 50/54* (2006.01)
*H01H 9/20* (2006.01)

(56) References Cited

U.S. PATENT DOCUMENTS 6,624,731 B2 * 9/2003 Passow et al. ............... 335/202
7,733,203 B2 * 6/2010 Kim .............................. 335/202
7,843,291 B2 * 11/2010 Titus ............................. 335/132
2005/0200439 A1 * 9/2005 Kawahara et al. ............ 335/128

FOREIGN PATENT DOCUMENTS

| JP | H02-143749 | 12/1990 |
| JP | H08-129947 | 5/1996 |
| JP | 2007-59084 A | 3/2007 |

* cited by examiner

ATTACHMENT/DETACHMENT STRUCTURE FOR ELECTROMAGNETIC CONTACTOR AND ACCESSORY UNIT AND ASSEMBLY METHOD FOR MOVABLE HOOK PORTION PROVIDED IN ACCESSORY UNIT

RELATED APPLICATIONS

The present application is National Phase of International Application No. PCT/JP2010/005584 filed Sept. 13, 2010, and claims priority from Japanese Application No. 2010-015214, filed Jan. 27, 2010.

TECHNICAL FIELD

The present invention relates to an attachment/detachment structure for an electromagnetic contactor and an accessory unit, and an assembly method for a movable hook portion provided in the accessory unit.

BACKGROUND ART

To an electromagnetic contactor, various accessory units are attached in accordance with a user's request. As a conventional attachment/detachment structure for the electromagnetic contactor and the accessory unit, there is known, e.g., Patent Document 1.

In an electromagnetic contactor of Patent Document 1, there is formed a pair of coupling pieces on the main body protruding in an L shape on a main body side coupling surface to which an accessory unit is coupled. In addition, in the accessory unit, there is formed a pair of coupling pieces on the unit protruding in a shape obtained by inverting the L shape of the coupling pieces on the main body on a unit side coupling surface to which the electromagnetic contactor is coupled.

When the accessory unit is attached to the electromagnetic contactor, the coupling surface of the unit of the accessory unit is gradually slid from an edge portion of the coupling surface of the main body of the electromagnetic contactor such that the unit side coupling pieces move toward the coupling pieces on the main body, and the unit side coupling pieces are engaged with the coupling pieces on the main body, whereby the accessory unit is attached to the electromagnetic contactor. Further, in order to detach the accessory unit from the electromagnetic contactor, the coupling surface of the unit of the accessory unit is gradually slid toward the edge portion of the coupling surface of the main body of the electromagnetic contactor such that the coupling pieces on the main body and the unit side coupling pieces are brought into a disengaged state.

Patent Document 1: Japanese Patent Application Laid-open No. H8-129947

DISCLOSURE OF THE INVENTION

However, the above-described attachment/detachment structure of Patent Document 1 requires attachment/detachment space for positioning the accessory unit at the periphery of the coupling surface of the main body of the electromagnetic contactor when the accessory unit is attached to or detached from the electromagnetic contactor. Consequently, when the electromagnetic contactor and other electric components are densely disposed, it is necessary to separate only the electromagnetic contactor from the other electric components, and then attach or detach the accessory unit, and there arises a problem that it is not possible to easily attach or detach the accessory unit.

In view of the foregoing, the present invention has been achieved by focusing on the unsolved problem of the above-described conventional art, and an object thereof is to provide an attachment/detachment structure for an electromagnetic contactor and an accessory unit which allows the accessory unit to be easily coupled to or detached from the electromagnetic contactor, and an assembly method for a movable hook portion provided in the accessory unit.

In order to achieve the above-described object, an attachment/detachment structure for an electromagnetic contactor and an accessory unit according to an embodiment is an attachment/detachment structure for an electromagnetic contactor and an accessory unit, the structure being configured such that there are provided a plurality of hooking holes formed in a main body side coupling surface of the electromagnetic contactor, and a fixed hook portion and a movable hook portion protruding from a unit side coupling surface of the accessory unit at positions corresponding to the hooking holes, and having respective claws oriented in a direction in which the claws are spaced apart from each other. The accessory unit is attached to the electromagnetic contactor by engaging the claws of the fixed hook portion and the movable hook portion with the hooking holes. The movable hook portion has a structure in which there are provided a hook portion main body formed with a movable claw and a pressed piece and a straight spring. The hook portion main body is slidably accommodated in a main body accommodation concave portion formed in the unit side coupling surface. The straight spring is accommodated in a spring accommodation concave portion formed in the unit side coupling surface so as to be orthogonal to a sliding direction of the hook portion main body, with a middle portion in a length direction of the straight spring being engaged with the hook portion main body. When the hook portion main body is slid in a disengaging direction which brings the movable claw and one of the hooking holes into a disengaged state by pressing the pressed piece, an elastic restoring force from the straight spring elastically deforming into a bow-like shape acts on the hook portion main body in a direction opposite to the disengaging direction.

According to the attachment/detachment structure for the electromagnetic contactor and the accessory unit according to the embodiment, when the pressed piece of the movable hook portion is pressed, the movable claw of the movable hook portion moves to a position at which the movable claw does not engage with the hooking hole of the electromagnetic contactor, and hence it is possible to move the movable hook portion side of the unit side coupling surface of the accessory unit close to or away from the maim body side coupling surface of the electromagnetic contactor. With this, even when the electromagnetic contactor is densely disposed together with other electric components, as long as space for attachment and detachment is present on the side of the main body side coupling surface of the electromagnetic contactor, it is possible to attach or detach the accessory unit without separating only the electromagnetic contactor from the other electric components. Consequently, it is possible to easily attach or detach the accessory unit to or from the electromagnetic contactor.

In addition, by releasing the pressing operation of the pressed piece of the hook portion main body, the hook portion main body is returned to the initial position by utilizing the elastic restoring force generated when the straight spring elastically deformed into the bow-like shape is linearly restored, and hence it is possible to provide the movable hook portion having a simple structure.

Further, in the attachment/detachment structure for the electromagnetic contactor and the accessory unit according to the embodiment, a spring holding piece holding an end portion of the straight spring is formed as a shape covering a part of an opening portion of an end portion of the spring accommodation concave portion, and a hole from making a molding die and communicating with an inside of the accessory unit is formed at the end portion of the spring accommodation concave portion so as to be covered with the spring holding piece.

According to the attachment/detachment structure for the electromagnetic contactor and the accessory unit according to the embodiment, it is possible to prevent foreign matters such as dust and the like from entering the inside of the accessory unit through the hole from making a molding die.

Furthermore, an assembly method for a movable hook portion provided in an accessory unit according to the embodiment is an assembly method for a movable hook portion provided in an accessory unit which is formed in a unit side coupling surface of the accessory unit and allows a movable claw to be engaged with a hooking hole formed in a main body side coupling surface of an electromagnetic contactor. The movable hook portion includes a slide plate formed with the movable claw, a straight spring, a slide plate accommodation concave portion formed in the unit side coupling surface and slidably accommodating the slide plate, a spring accommodation concave portion linearly formed in the unit side coupling surface continuously from the slide plate accommodation concave portion so as to be orthogonal to a sliding direction of the slide plate and accommodating the straight spring, a step portion formed at a bottom portion of the slide plate accommodation concave portion and regulating a sliding amount of the slide plate, and a detachment prevention portion preventing the slide plate from being detached from the slide plate accommodation concave portion by engaging with the slide plate. The assembly method includes accommodating the slide plate, which is placed on the step portion, in the slide plate accommodation concave portion without engaging the slide plate with the detachment prevention portion, sliding the slide plate to move the slide plate down from the step portion and regulating the sliding amount using the step portion to maintain a state of the engagement with the detachment prevention portion, and accommodating the straight spring in the spring accommodation concave portion while engaging the straight spring with the slide plate.

According to the assembly method for the movable hook portion provided in the accessory unit according to the embodiment, when the slide plate accommodated in the slide plate accommodation concave portion is slid, the slide plate is moved down from the step portion, and the sliding amount is regulated using the step portion to maintain the state of the engagement with the detachment prevention portion, and hence it is possible to prevent the slide plate from being detached from the slide plate accommodation concave portion even in the process of assembling the movable hook portion.

Moreover, in the assembly method for the movable hook portion provided in the accessory unit according to the embodiment, the detachment prevention portion is a notch formed in a vicinity of the slide plate accommodation concave portion and holding the slide plate.

According to the assembly method for the movable hook portion provided in the accessory unit according to the embodiment, the detachment prevention portion is the notch formed in the vicinity of the slide plate accommodation concave portion and holding the slide plate, whereby it is possible to achieve a reduction in the manufacturing cost of the movable hook portion.

In addition, in the assembly method for the movable hook portion provided in the accessory unit according to the embodiment, the detachment prevention portion is a holding protrusion piece formed to protrude so as to cover a part of the slide plate accommodation concave portion and holding the slide plate with the bottom portion of the slide plate accommodation concave portion.

According to the assembly method for the movable hook portion provided in the accessory unit according to the embodiment, the detachment prevention portion is the holding protrusion piece formed to protrude so as to cover a part of the slide plate accommodation concave portion and sandwiching the slide plate with the bottom portion of the slide plate accommodation concave portion, whereby it is possible to achieve a reduction in the manufacturing cost of the movable hook portion.

Further, in the assembly method for the movable hook portion provided in the accessory unit according to the embodiment, a guide wall guiding the straight spring to the spring accommodation concave portion is formed at an opening edge portion of the spring accommodation concave portion, and the straight spring is slid along the guide wall to be accommodated in the spring accommodation concave portion.

According to the assembly method for the movable hook portion provided in the accessory unit according to the embodiment, it is possible to easily attach the thin and short straight spring to the spring accommodation concave portion.

According to the attachment/detachment structure for the electromagnetic contactor and the accessory unit according to the present invention, when the pressed piece of the movable hook portion is pressed, the movable claw of the movable hook portion moves to the position at which the movable claw does not engage with the hooking hole of the electromagnetic contactor, and hence it is possible to move the movable hook portion side of the unit side coupling surface of the accessory unit close to or away from the main body side coupling surface of the electromagnetic contactor. Consequently, even when the electromagnetic contactor is densely disposed together with other electric components, as long as space for attachment and detachment is present on the side of the main body side coupling surface of the electromagnetic contactor, it is possible to attach or detach the accessory unit without separating only the electromagnetic contactor from the other electric components. Therefore, it is possible to easily attach or detach the accessory unit to or from the electromagnetic contactor.

In addition, by releasing the pressing operation of the pressed piece of the hook portion main body, the hook portion main body is returned to the initial position by utilizing the elastic restoring force generated when the straight spring elastically deformed into the bow-like shape is linearly restored, and hence it is possible to provide the movable hook portion having the simple structure.

Further, according to the assembly method for the movable hook portion provided in the accessory unit, when the slide plate accommodated in the slide plate accommodation concave portion is slid, the slide plate is moved down from the step portion and the sliding amount is regulated using the step portion to maintain the state of the engagement with the detachment prevention portion, and hence it is possible to prevent the slide plate from being detached from the slide plate accommodation concave portion even in the process of assembling the movable hook portion.

BEST MODE FOR CARRYING OUT THE INVENTION

A detailed description is given hereinbelow of an aspect for carrying out the present invention (hereinbelow referred to as an embodiment) with reference to the drawings.

Figure 1:
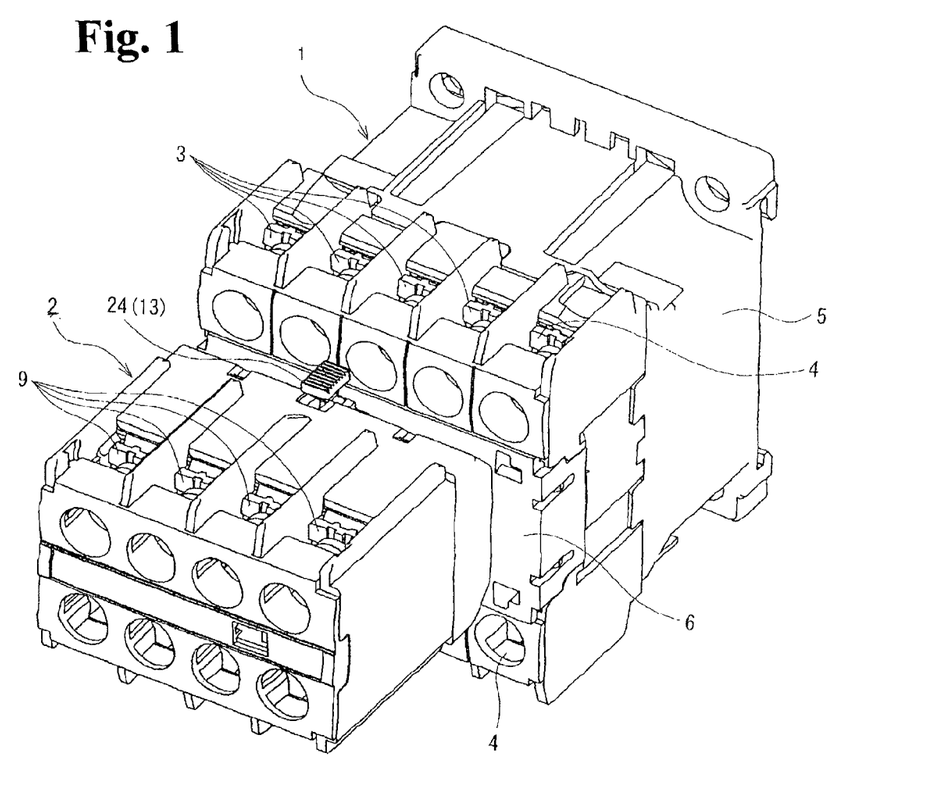
FIG. 1 is a perspective view showing a state where an accessory unit is attached to an electromagnetic contactor according to the present invention.

FIG. 1 shows an electromagnetic contactor 1 and an auxiliary contact unit 2 attached to the electromagnetic contactor 1 as an accessory unit.

The electromagnetic contactor 1 is a device which includes terminal portions 3 each having a contact and a coil terminal portion 4. In a main body case 5, there are accommodated components such as a contact portion having a movable contact and a fixed contact, an electromagnet portion, and the like which are not shown, and an arc extinguishing chamber (not shown) accommodating the contact portion is covered with an arc extinguishing cover 6 which is fitted in the main body case 5.

Figure 2:
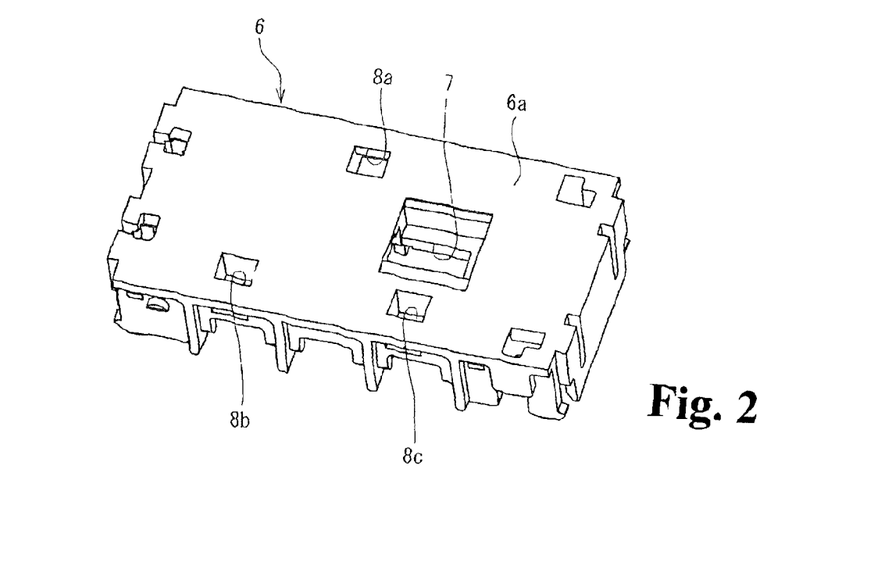
FIG. 2 is a perspective view showing an arc extinguishing cover constituting the electromagnetic contactor.

A rectangular cover surface 6a of the arc extinguishing cover 6 shown in FIG. 2 is disposed at the front in an attachment position of the electromagnetic contactor 1, and the cover surface 6a serves as a main body side coupling surface for coupling the auxiliary contact unit 2.

The cover surface 6a is formed with a display window 7 into which an operation display piece (not shown) of the above-mentioned contact portion enters, and first to third hooking holes 8a, 8b, and 8c for coupling the auxiliary contact unit 2 at three positions. The first hooking hole 8a is formed at a position close to one of long side edge portions of the cover surface 6a, while the other second and third hooking holes 8b and 8c are formed at positions close to the other long side edge portion of the cover surface 6a.

The auxiliary contact unit 2 includes auxiliary circuit terminal portions 9 shown in FIG. 1 and an auxiliary contact portion having an auxiliary movable contact and an auxiliary fixed contact in a case which is not shown, and is a device in which the auxiliary movable contact operates correspondingly to the contact portion of the electromagnetic contactor 1, and thereby performs opening and closing operations.

Figure 3:
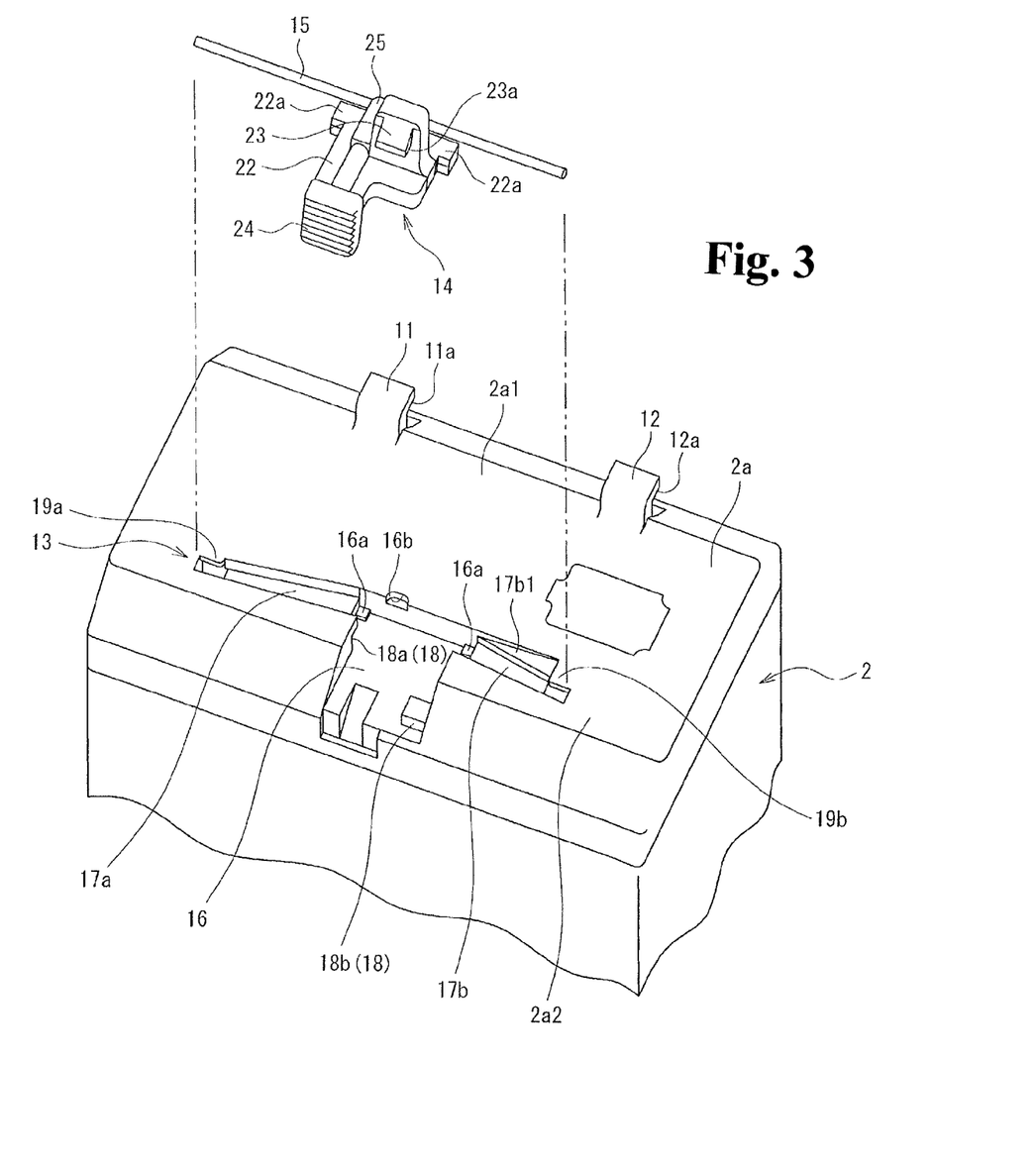
FIG. 3 is an exploded perspective view showing a structure of a movable hook portion provided in the accessory unit.

FIG. 3 shows a bottom portion of the auxiliary contact unit 2. A rectangular case bottom surface 2a serves as a unit side coupling surface for coupling the electromagnetic contactor 1 with the cover surface 6a of the electromagnetic contactor 1 (main body side coupling surface) to contact with the case bottom surface 2a.

On the case bottom surface 2a, a pair of fixed hook portions 11 and 12 is provided on the side of one long side edge portion 2a1 to protrude in spaced-apart relation, and a movable hook portion 13 is provided on the side of the other long side edge portion 2a2.

Claws 11a and 12a formed on the tip side of each of the pair of fixed hook portions 11 and 12 are oriented in a direction moving away from the case bottom surface 2a.

Figure 4:
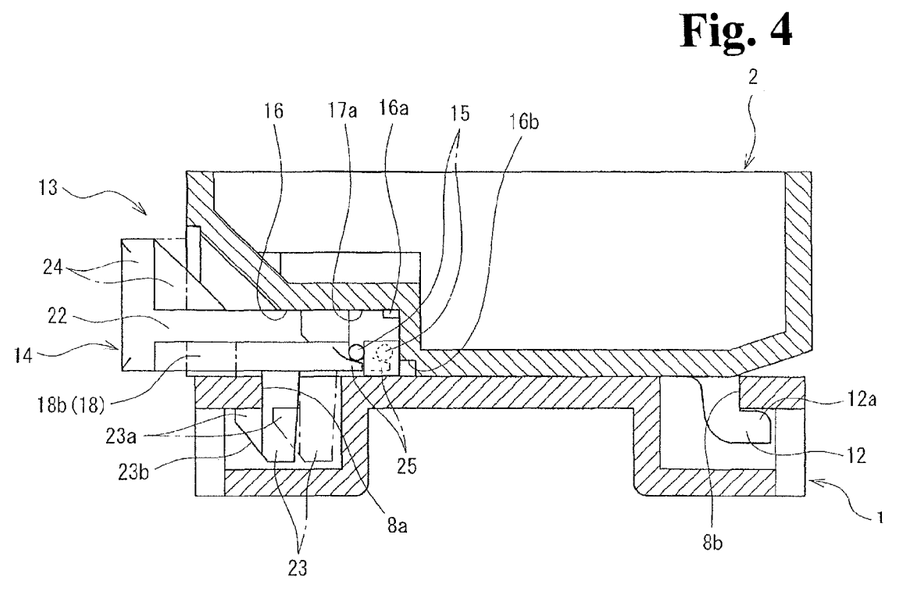
FIG. 4 is a cross-sectional view of a principal-portion of a coupling structure for the electromagnetic contactor and the accessory unit.

As shown in FIGS. 3 and 4, the movable hook portion 13 includes a hook portion main body 14, a straight spring 15, a main body accommodation concave portion 16 which is formed in the case bottom surface 2a and accommodates the hook portion main body 14, a pair of spring accommodation concave portions 17a and 17b which is formed continuously from the main body accommodation concave portion 16 in the case bottom surface 2a and accommodates the straight spring 15, a main body holding portion 18 which slidably holds the hook portion main body 14 in the main body accommodation concave portion 16, and holding pieces 19a and 19b which are formed at end portions of the pair of spring accommodation concave portion 17a and 17b positioned farthest from the main body accommodation concave portion 16, and hold both end portions of the straight spring 15.

As shown in FIG. 3, the hook portion main body 14 includes a slide plate 22, an engagement portion 23 which is provided to protrude from the upper surface of the slide plate 22 and formed with a claw portion 23a on its upper end side, a pressed piece 24 which protrudes from the side surface of the slide plate 22 in the direction of orientation of the claw portion 23a, and a spring engagement holding piece 25 which is formed to protrude from the side of the side surface of the slide plate 22 opposite to the side of the pressed piece 24, engaged with a central portion in a length direction of the straight spring 15, and prevents the straight spring 15 from moving upward. In addition, the slide plate 22 is formed with a held piece 22a which protrudes outwardly in a plate width direction.

As shown in FIG. 3, the main body accommodation concave portion 16 is formed to extend from the other long side edge portion 2a2 of the case bottom surface 2a toward the one long side edge portion 2a1 thereof and, as shown in FIG. 4, accommodates the hook portion main body 14 having the claw portion 23a oriented in an opposite direction relative to the orientation of the claws 11a and 12a of the pair of fixed hook portions 11 and 12, the pressed piece 24 protruding outwardly from the other long side edge portion 2a2, and the spring engagement holding piece 25 positioned on the side of the one long side edge portion 2a1 such that the hook portion main body 14 is movable toward the one long side edge portion 2a1 and the other long side edge portion 2a2.

Herein, as shown in FIG. 3, at the bottom portions of the main body accommodation concave portion 16 at positions closest to the one long side edge portion 2a1, there are formed step portions 16a which slightly protrude from the bottom portions. The slide plate 22 contacts the side portion of each of the step portions 16a, and the movement of the hook portion main body 14 toward the one long side edge portion 2a1 is thereby regulated. In addition, in the upper portion of the wall of the main body accommodation concave portion 16 at a position closest to the one long side edge portion 2a1, there is formed a concave portion 16b into which the spring engagement holding piece 25 of the hook portion main body 14 enters.

As shown in FIG. 3, one spring accommodation concave portion 17a of the pair of spring accommodation concave portions 17a and 17b linearly extends from the edge portion of the main body accommodation concave portion 16 on the side of the one long side edge portion 2a1 in one of longitudinal directions of the case bottom surface 2a, and an opening dimension in its width direction is set to become gradually narrower with distance from the main body accommodation concave portion 16.

The other spring accommodation concave portion 17b also linearly extends from the edge portion of the main body accommodation concave portion 16 on the side of the one long side edge portion 2a1 in the other longitudinal direction of the case bottom surface 2a, and an opening dimension in its width direction is set to become gradually narrower with distance from the main body accommodation concave portion 16. Herein, at the edge portion of the case bottom surface 2a forming the other spring accommodation concave portion 17b on the side of the one long side edge portion 2a1, there is formed a guide inclined wall 17b1 which has a shape inclined toward the main body accommodation concave portion 16, and guides the straight spring 15 moving toward the spring accommodation concave portion 17b while allowing the straight spring 15 to slide.

Figure 5:
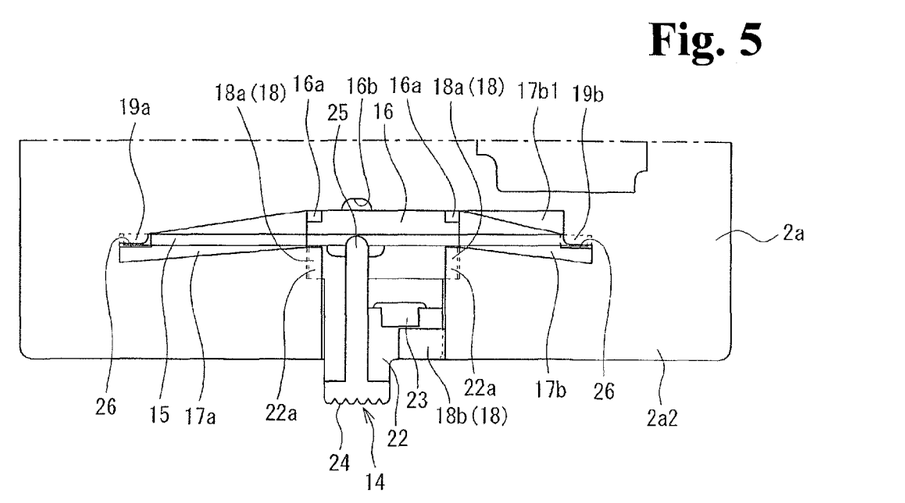
FIG. 5 shows a structure of the movable hook portion.

Further, as shown in FIGS. 3 and 5, at the end portions of the pair of spring accommodation concave portions 17a and 17b positioned farthest from the main body accommodation concave portion 16, there are formed the holding pieces 19a and 19b which extend from the side of the other long side edge portion 2a2 toward the one long side edge portion 2a2 to partially cover the end portions.

Figure 6:
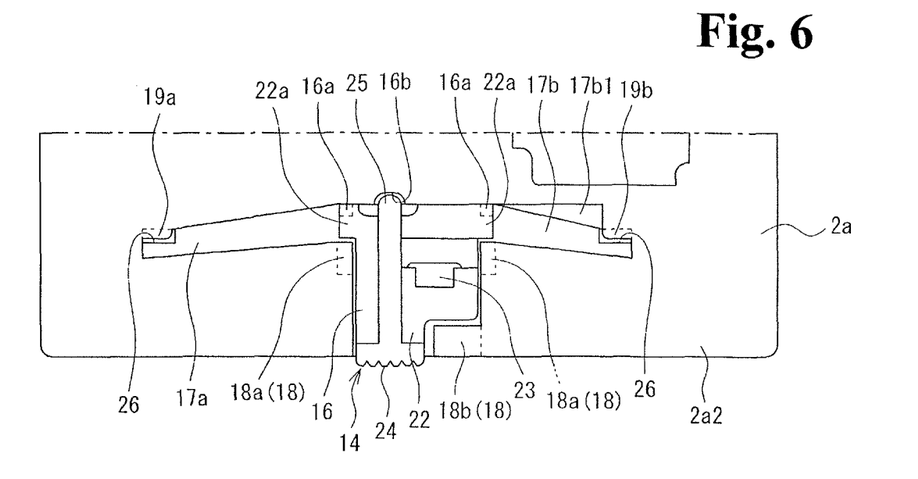
FIG. 6 shows a state where a slide plated is accommodated in a slide plate accommodation concave portion.

At the bottoms of the end portions of the pair of spring accommodation concave portions 17a and 17b which are covered with the holding pieces 19a and 19b, as also shown in FIG. 6, there are formed holes 26 from making molding die which communicate with the inside of the auxiliary contact unit 2.

Furthermore, as shown in FIG. 5, the main body holding portion 18, which slidably holds the hook portion main body 14 in the main body accommodation concave portion 16, is a notch portion formed continuously from the main body accommodation concave portion 16, and is constituted of a holding notch portion 18a which allows the held piece 22a formed in the slide plate 22 of the hook portion main body 14 shown in FIG. 3 to enter therein, and a holding protrusion piece 18b which protrudes on one side of the one long side edge portion 2a1 of the main body accommodation concave portion 16 so as to cover the opening portion and holds the slide plate 22 of the hook portion main body 14 with the bottom portion of the main body accommodation concave portion 16.

Note that an accessory unit of the present invention corresponds to the auxiliary contact unit 2, a unit side coupling surface of the present invention corresponds to the case bottom surface 2a, a main body side coupling surface of the present invention corresponds to the cover surface 6a, a hooking hole of the present invention corresponds to each of the first to third hooking holes 8a, 8b, and 8c, a slide plate accommodation concave portion of the present invention corresponds to the main body accommodation concave portion 16, a detachment prevention portion of the present invention corresponds to the main body holding portion 18, a notch of the present invention corresponds to the holding notch portion 18a, and a movable claw of the present invention corresponds to the claw portion 23a.

Figure 7:
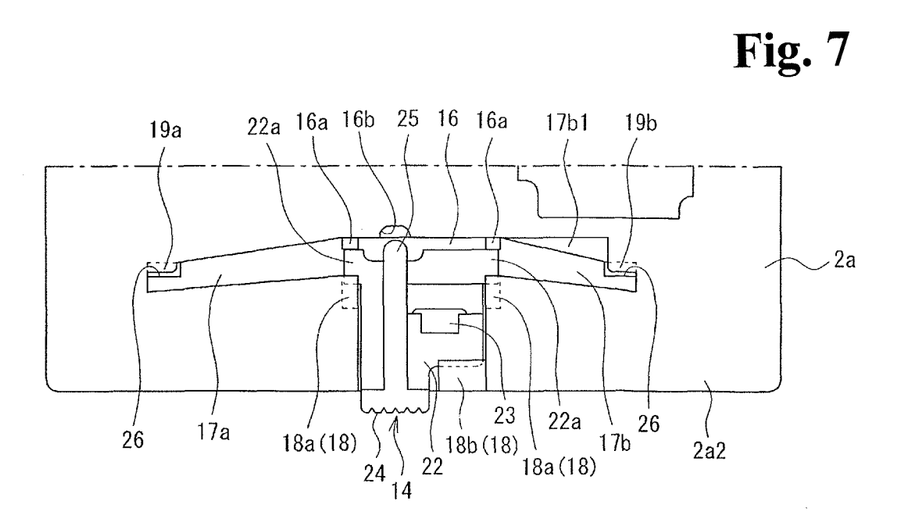
FIG. 7 shows a state where the slide plate is slid and held by a step portion and a detachment prevention portion while a sliding amount of the slide plate is regulated.

Next, a description is given of an assembly procedure of the movable hook portion 13 with reference to FIGS. 5 to 7.

As shown in FIG. 6, the slide plate 22 of the hook portion main body 14 is formed into a shape which causes the slide plate 22 to be accommodated in the main body accommodation concave portion 16 without being engaged with the holding protrusion piece 18b when the spring engagement holding piece 25 is positioned in the concave portion 16b and the held piece 22a formed in the slide plate 22 is placed on the step portions 16a. Consequently, in order to assemble the movable hook portion 13, the slide plate 22 of the hook portion main body 14 is firstly accommodated in the main body accommodation concave portion 16 such that the held piece 22a is placed on the step portions 16a, and the spring engagement holding piece 25 is positioned in the concave portion 16b.

Next, as shown in FIG. 7, the hook portion main body 14 accommodated in the main body accommodation concave portion 16 is slid toward the other long side edge portion 2a2. With this operation, the spring engagement holding piece 25 is moved away from the concave portion 16b, the held piece 22a on the step portions 16a is moved down from the step portions 16a, a part of the held piece 22a enters into the holding notch portion 18a, and a part of the slide plate 22 on the side of the other long side edge portion 2a2 is held between the bottom portion of the main body accommodation concave portion 16 and the holding protrusion piece 18b.

With this, even when the hook portion main body 14 further slides toward the other long side edge portion 2a2, the entire held piece 22a enters into the holding notch portion 18a, and the part of the slide plate 22 on the side of the other long side edge portion 2a2 is continuously held between the bottom portion of the main body accommodation concave portion 16 and the holding protrusion piece 18b. In addition, the movement of the hook portion main body 14 toward the one long side edge portion 2a1 is prevented by the contact of the held portion 22a with the step portions 16a, a part of the held piece 22a enters into the holding notch portion 18a, and a part of the slide plate 22 on the side of the other long side edge portion 2a2 is held between the bottom portion of the main body accommodation concave portion 16 and the holding protrusion piece 18b.

Thus, when the hook portion main body 14 in the main body accommodation concave portion 16 is slid toward the other long side edge portion 2a2, the hook portion main body 14 is slidably supported by the holding notch portion 18a and the holding protrusion piece 18b while the sliding amount thereof is regulated by the step portions 16a, and hence the hook portion main body 14 is accommodated undetachably from the main body accommodation concave portion 16.

Then, one end of the straight spring 15 is inserted into the end portion of the one spring accommodation concave portion 17a. With this, one end of the straight spring 15 is positioned on the back side of one holding piece 19a.

Subsequently, the straight spring 15 is gradually moved toward the other spring accommodation concave portion 17b by using the side of the end of the straight spring 15 positioned on the back side of the holding piece 19a as a support. During this movement, the straight spring 15 is slid along the guide inclined wall 17b1 formed at the edge portion of the case bottom surface 2a on the side of the one long side edge portion 2a1. With this, the straight spring 15 is guided by the guide inclined wall 17b1 inclined toward the main body accommodation concave portion 16 to be smoothly accommodated in the other spring accommodation concave portion 17b, and the other end of the straight spring 15 is positioned on the back side of the other holding piece 19b.

Then, as shown in FIG. 5, both end portions of the straight spring 15 are accommodated in the spring accommodation concave portions 17a and 17b while being held by the pair of holding pieces 19a and 19b, the straight spring 15 is engaged with the spring engagement holding piece 25 at the central portion in the length direction thereof, and the hook portion main body 14 having the spring engagement holding piece 25 engaged with the straight spring 15 is brought into a state where the pressed piece 24 thereof protrudes outwardly from the side of the other long side edge portion 2a2.

Next, a description is given of the effect by the above-described assembly of the movable hook portion 13.

When the slide plate 22 of the hook portion main body 14 in the main body accommodation concave portion 16 is slid toward the other long side edge portion 2a2, the hook portion main body 14 in the main body accommodation concave portion 16 is held by the step portions 16a, the holding notch portion 18a, and the holding protrusion piece 18b while the sliding amount thereof is regulated, and hence it is possible to prevent the hook portion main body 14 from being detached from the main body accommodation concave portion 16 in the process of the assembly.

In addition, each of the step portions 16a, the holding notch portion 18a, and the holding protrusion piece 18b which holds the hook portion main body 14 is formed as a member which protrudes from a part of the main body accommodation concave portion 16 or as a notch portion continuous from the main body accommodation concave portion 16 with a simple structure, and hence it is possible to achieve a reduction in the manufacturing cost of the movable hook portion 13.

Further, as for the straight spring 15 which is accommodated in the pair of spring accommodation concave portions 17a and 17b, when the other end side thereof is gradually slid along the guide inclined wall 17b1 formed at the edge portion of the case bottom surface 2a on the side of the one long side edge portion 2a1 by using one end side of the straight spring 15 positioned on the back side of the holding piece 19a as the support, the straight spring 15 is guided by the guide inclined wall 17b1 and can be smoothly accommodated in the other spring accommodation concave portion 17b, and hence it is possible to easily attach the thin and short straight spring 15 to the pair of spring accommodation concave portions 17a and 17b.

Next, a description is given of the operation and effect of an attachment/detachment structure for the electromagnetic contactor 1 and the auxiliary contact unit 2 of the present embodiment.

In order to attach the auxiliary contact unit 2 to the electromagnetic contactor 1, with the auxiliary contact unit 2 being tilted and held, the claws 11a and 12a of the fixed hook portions 11 and 12 are engaged with the second and third hooking holes 8b and 8c formed in the arc extinguishing cover 6 of the electromagnetic contactor 1. Subsequently, while the pressed piece 24 of the movable hook portion 13 of the auxiliary contact unit 2 is kept pressed, the movable hook portion 13 is gradually moved close to the first hooking hole 8a of the arc extinguishing cover 6.

While the pressed piece 24 of the movable hook portion 13 is kept pressed, or while guided toward the second hooking hole 8a by a tapered surface 23b formed continuously from the claw portion 23a, the engagement portion 23 moves to a position at which the engagement portion 23 does not engage with the first hooking hole 8a (a part indicated by a one-dot chain line in FIG. 4), and the straight spring 15 is pressed by the slide plate 22 to be elastically deformed into a bow-like shape.

Then, when the pressing operation of the pressed piece 24 is released, the slide plate 22 moves to the initial position by an elastic restoring force which linearly restores the straight spring 15, the claw portion 23a of the engagement portion 23 engages with the first hooking hole 8a (a part indicated by a solid line in FIG. 4), and the attachment of the auxiliary contact unit 2 to the electromagnetic contactor 1 is completed.

On the other hand, in order to detach the auxiliary contact unit 2 from the electromagnetic contactor 1, first, by pressing the pressed piece 24 of the movable hook portion 13, the engagement portion 23 moves to the position at which the engagement portion 23 does not engage with the first hooking hole 8a, and the auxiliary contact unit 2 on the side of the movable hook portion 13 is gradually moved away from the arc extinguishing cover 6 of the electromagnetic contactor 1. Subsequently, the engagement between the second and third hooking holes 8b and 8c of the electromagnetic contactor 1 and the fixed hook portions 11 and 12 of the auxiliary contact unit 2 is released, and the auxiliary contact unit 2 is thereby detached from the electromagnetic contactor 1.

According to the attachment/detachment structure for the electromagnetic contactor 1 and the auxiliary contact unit 2 of the present embodiment, when the pressed piece 24 of the movable hook portion 13 of the auxiliary contact unit 2 is pressed, the claw portion 23a of the movable hook portion 13 moves to the position at which the claw portion 23a does not engage with the first hooking hole 8a of the electromagnetic contactor 1, and hence it is possible to move the auxiliary contact unit 2 on the side of the movable hook portion 13 close to or away from the arc extinguishing cover 6 of the electromagnetic contactor 1. Consequently, even when the electromagnetic contactor 1 is densely disposed together with other electric components, as long as space for attachment and detachment is present on the side of the arc extinguishing cover 6 of the electromagnetic contactor 1, it is possible to attach or detach the auxiliary contact unit 2 without separating only the electromagnetic contactor 1 from the other electric components. Therefore, it is possible to easily attach or detach the auxiliary contact unit 2 to or from the electromagnetic contactor 1.

Next, a description is given of the operation and effect of the movable hook portion 13 provided in the auxiliary contact unit 2.

The movable hook portion 13 is structured such that the hook portion main body 14 slidably accommodated in the main body accommodation concave portion 16 is engaged with the straight spring 15 accommodated in the pair of spring accommodation concave portions 17a and 17b disposed orthogonal to the main body accommodation concave portion 16 and, by releasing the pressing operation of the pressed piece 24 of the hook portion main body 14, the hook portion main body 14 is returned to the initial position by utilizing the elastic restoring force generated when the straight spring 15 elastically deformed into the bow-like shape is linearly restored, and hence it is possible to provide the movable hook portion 13 having the simple structure.

In addition, the holding pieces 19a and 19b formed at the end portions of the pair of spring accommodation concave portions 17a and 17b which hold the both end portions of the straight spring 15 are structured so as to cover the holes 26 required for molding die making communicating with the inside of the auxiliary contact unit 2 (see FIGS. 5 to 7), it is possible to prevent foreign matters such as dust and the like from entering the inside of the auxiliary contact unit 2 through the holes 26 required for molding die making.

Although the present embodiment has shown an embodiment in which the auxiliary contact unit 2 is attached to the electromagnetic contactor 1, the gist of the present invention is not limited thereto, and a similar effect can be achieved by applying the present invention to accessory units such as a surge absorbing unit or a reversible unit attached to the upper portion of the electromagnetic contactor 1.

Industrial Applicability

As has been described thus far, an attachment/detachment structure for an electromagnetic contactor and an accessory unit, and an assembly method for a movable hook portion provided in the accessory unit according to the present invention are useful for easily coupling or detaching the accessory unit to or from the electromagnetic contactor even when the electromagnetic contactor and other electric components are densely disposed.

Explanation of Reference Numerals

1 . . . electromagnetic contactor, 2 . . . auxiliary contact unit, 2a . . . case bottom surface, 2a1 . . . one long side edge portion, 2a2 . . . the other long side edge portion, 3 . . . terminal portion, 4 . . . coil terminal portion, 5 . . . main body case, 6 . . . arc extinguishing cover, 6a . . . cover surface, 7 . . . display window, 8a, 8b, 8c . . . first to third hooking holes, 9 . . . auxiliary circuit terminal portion, 11, 12 . . . fixed hook portion, 11a, 12a . . . claw, 13 . . . movable hook portion, 14 . . . hook portion main body, 15 . . . straight spring, 16 . . . main body accommodation concave portion, 16a . . . step portion, 16b . . . concave portion, 17a,17b . . . spring accommodation concave portion, 17b1 . . . guide inclined wall, 18 . . . main body holding portion, 18a . . . holding notch portion, 18b . . . holding protrusion piece, 19a,19b . . . holding piece, 22 . . . slide plate, 22a . . . held piece, 23 engagement portion, 23a . . . claw portion, 23b . . . tapered surface, 24 . . . pressed piece, 25 . . . engagement holding piece, 26 hole for making a molding die

What is claimed is:

1. An attachment/detachment structure for an electromagnetic contactor and an accessory unit, comprising:
a plurality of hooking holes formed in a main body side coupling surface of the electromagnetic contactor, and
a movable hook portion and a fixed hook portion protruding from a unit side coupling surface of the accessory unit at positions corresponding to the hooking holes and having claws, the accessory unit being attached to the electromagnetic contactor by engaging the claws of the fixed hook portion and the movable hook portion with the hooking holes,
wherein the movable hook portion includes a hook portion main body formed with a movable claw and a pressed piece, and a straight spring; the hook portion main body is slidably accommodated in a main body accommodation concave portion formed in the unit side coupling surface; and the straight spring is accommodated in a spring accommodation concave portion formed in the unit side coupling surface to be orthogonal to a sliding direction of the hook portion main body, a middle portion in a length direction of the straight spring engaging with the hook portion main body, and
wherein when the pressed piece is pressed and the hook portion main body slides in a disengaging direction to bring the movable claw and one of the hooking holes into a disengaged state, an elastic restoring force from elastically deforming the straight spring into a bow-like shape acts on the hook portion main body in a direction opposite to the disengaging direction.

2. An attachment/detachment structure for an electromagnetic contactor and an accessory unit according to claim 1, wherein a spring holding piece holding an end portion of the straight spring is formed as a shape covering a part of an opening portion of an end portion of the spring accommodation concave portion, and
a hole communicating with an inside of the accessory unit is formed at the end portion of the spring accommodation concave portion to be covered by the spring holding piece.

3. An assembly method for a movable hook portion provided in an accessory unit formed in a unit side coupling surface of the accessory unit to engage a movable claw with a hooking hole formed in a main body side coupling surface of an electromagnetic contactor,
wherein the movable hook portion comprises a slide plate formed with the movable claw, a straight spring, a slide plate accommodation concave portion formed in the unit side coupling surface and slidably accommodating the slide plate, a spring accommodation concave portion linearly formed in the unit side coupling surface continuously from the slide plate accommodation concave portion to be orthogonal to a sliding direction of the slide plate and accommodating the straight spring, a step portion formed at a bottom portion of the slide plate accommodation concave portion and regulating a sliding amount of the slide plate, and a detachment prevention portion preventing the slide plate from detaching from the slide plate accommodation concave portion by engaging with the slide plate,
the assembly method comprising:
accommodating the slide plate, in a condition of being placed on the step portion, in the slide plate accommodation concave portion without engaging the slide plate with the detachment prevention portion;
sliding the slide plate to move the slide plate down from the step portion and regulating the sliding amount using the step portion to maintain a state of the engagement with the detachment prevention portion; and
accommodating the straight spring in the spring accommodation concave portion while engaging the straight spring with the slide plate.

4. An assembly method for a movable hook portion provided in an accessory unit according to claim 3, wherein the detachment prevention portion is a notch formed in a vicinity of the slide plate accommodation concave portion and holding the slide plate.

5. An assembly method for a movable hook portion provided in an accessory unit according to claim 3, wherein the detachment prevention portion is a holding protrusion piece formed to protrude for covering a part of the slide plate accommodation concave portion and sandwiching the slide plate with the bottom portion of the slide plate accommodation concave portion.

6. An assembly method for a movable hook portion provided in an accessory unit according to claim 3, wherein a guide wall guiding the straight spring to the spring accommodation concave portion is formed at an opening edge portion of the spring accommodation concave portion, and the straight spring is slid along the guide wall to be accommodated in the spring accommodation concave portion.

* * * * *